Figures 1, 2:
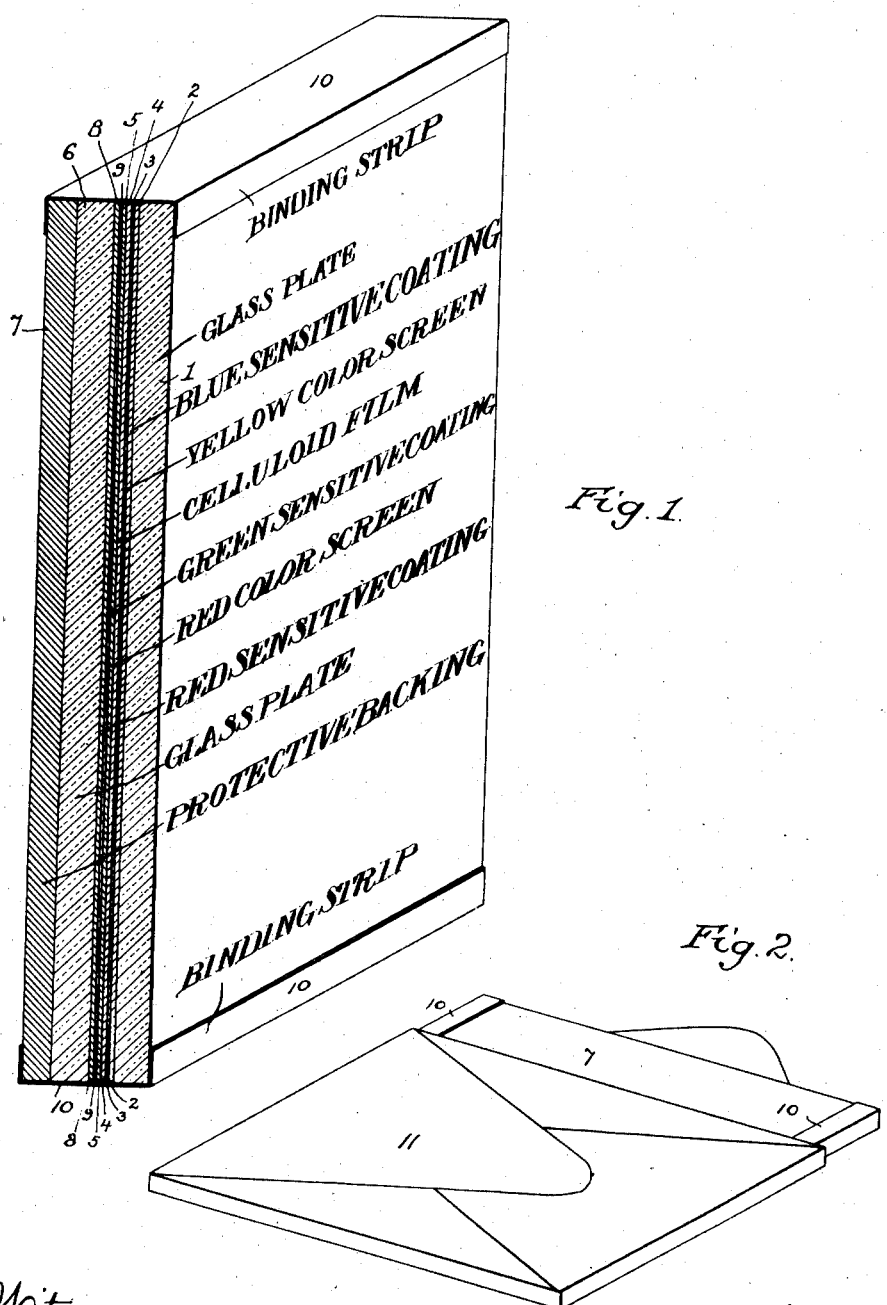

F. E. IVES.
FILM PACK FOR THREE COLOR PHOTOGRAPHY.
APPLICATION FILED FEB. 14, 1907.

927,244.

Patented July 6, 1909.

Witnesses
Harry L. Smith
Hamilton D. Turner

Inventor
Frederic E. Ives
by his attorneys
Smith & Frazer

UNITED STATES PATENT OFFICE.

FREDERIC E. IVES, OF WEEHAWKEN, NEW JERSEY.

FILM-PACK FOR THREE-COLOR PHOTOGRAPHY.

No. 927,244.  Specification of Letters Patent.  Patented July 6, 1909.

Application filed February 14, 1907. Serial No. 357,248.

*To all whom it may concern:*

Be it known that I, FREDERIC E. IVES, a citizen of the United States, residing at Woodcliffe-on-the-Hudson, Weehawken, New Jersey, have invented an Improved Film-Pack for Three - Color Photography, of which the following is a specification.

The object of my invention is to provide a comparatively simple and practical means for producing the three negatives required for carrying out the so-called three color process of color photography. For most forms of this process three separate negative images are required, made on color-sensitive plates exposed in the camera through color screens to represent the relative distribution of the three fundamental colors, red, green and blue-violet, in the objects to be reproduced. Heretofore this has usually been accomplished either by successive exposures or by a single exposure in a special camera, a number of such cameras having been previously patented by me.

Successive exposures are impracticable for some subjects, as, for instance, when the objects are not perfectly stationary or the light is fluctuating, while the special single exposure tri-chromatic cameras are complicated and costly and their capacity is limited in various ways. It is very desirable, therefore, to provide a practicable means for employing, in this class of work, cameras of ordinary construction, in such manner that an ordinarily expert photographer can, without special experience in color photography, produce negatives of the character required. With the view of meeting this requirement it has been proposed to superpose the necessary color-sensitive plates or films, with interposed pellicle color screens, in a single plate holder, but this plan did not meet practical requirements or come into practical use because it involved too many reflecting surfaces and too great a separation of the planes of the sensitive surfaces. It has also been proposed to make a composite film on a single glass plate, which is also objectionable because it involves elaborate special processes of manufacture and delicate and troublesome after processes of stripping the films apart and preparing them for development in order to obtain the separate developed negatives.

The object of my invention is to overcome these objections, an object which I attain in the manner hereinafter set forth, reference being had to the accompanying drawing, in which—

Figure 1 is an exaggerated sectional perspective view of a film pack made in accordance with my invention, and Fig. 2 is a perspective view of a light-proof casing or envelop usually employed in connection with the film pack, the latter being shown partially withdrawn from said envelop.

I first take a plate 1 of glass, or other relatively rigid and transparent material, and apply to one face of the same a film 2, preferably of bromid of silver in gelatin, of exceptionally fine grain and transparency and sensitive chiefly to the blue-violet and ultra-violet spectrum rays, suitable plates for this purpose approximating in character those employed in the Lippmann process. This sensitive plate 1 is for the negative to be made chiefly by the blue and blue-violet spectrum rays and it is ultimately to be placed in the camera with the uncoated face of the plate facing the objective. As the first element in my film pack, namely the plate 1 coated as aforesaid absorbs most of those spectrum rays to which it is sensitive it serves as a color screen for the succeeding element, a green-sensitive film, but, as the absorption may not be perfect for this purpose, I usually flow over the face of the blue-sensitive film an alcoholic solution of a water soluble yellow dye of suitable shade and intensity to make the combined absorption act as a suitable screen for the green-sensitive film. The evaporation or drying off of the alcohol leaves a superficial color film 3 all on the surface and not diffused into the gelatin film, and of such exceeding tenuity as to add practically nothing to the material thickness of the sensitive plate or number of reflecting surfaces. The second element is thin celluloid or collodion 4 coated with a green-sensitive bromid of silver and gelatin film 5 and I place this element so coated preferably with the film side away from the film on the first plate. The third element is a plate 6 of glass or other relatively rigid material, coated with a red sensitive gelatin bromid film 8 and the plate 6 is preferably backed with a sheet 7 of black paper or other material impervious to light. This plate 6 with its sensitive film 8 is first coated with an alcoholic solution of a water soluble red or orange dye of such character as may be required to supplement the absorption of the blue-sensitive and green-sensitive films and thereby constitute a suitable screen for securing a correct record for the red color; the evaporation or drying off of the alcohol leaving, as in the case of the color applied to the blue-sensitive plate, a superficial and exceedingly thin film 9 which adds practically nothing to the material thickness of the plate or to the number of reflecting surfaces. The plate 6 with its sensitive film 8 and coated as above mentioned with the film 9 is placed with its sensitive film 8 against the green sensitive film 5. The three sensitive surfaces are then practically in material contact that is to say not separated by a separate intervening film or a measurable air space and are held perfectly flat by the relatively rigid supports of the red-sensitive and blue-sensitive surfaces, which also serve to protect them from mechanical injury and exposure to air. I then, by preference, bind the edges of the pack together by means of a strip of paper 10 or other material so as to produce a film pack which may be handled exactly like a single plate in ordinary photography. After exposure the elements of the pack can be readily separated one from another by cutting the binding strips and the separated films can be developed, fixed, and washed in the usual way in order to obtain the three negatives required for carrying out the various three-color processes, the water soluble color screens of the red-sensitive and blue-sensitive plates being removed by the dissolving action of the liquids to which the plates are subjected in performing these operations.

In order to prevent spotting or streaking of the superficial color deposit constituting each color screen it is preferable to dilute, with from five to ten per cent. of water, the alcohol employed as a solvent of the dye stuff. If desired, the red or orange color screen may be applied to the face of the green-sensitive film instead of to that of the red-sensitive film and the yellow screen may be applied to the back of the celluloid or collodion which carries said green-sensitive film, but the method of procedure first described is preferred because of the relatively rigid character of the plates which carry the blue-sensitive and red-sensitive films since these plates are not subject to the swelling or distortion which might follow the application of the color solution to such a body as a thin celluloid or collodion film.

In the absence of the light-proof backing applied to the back of the plate carrying the red-sensitive film the pack would have to be handled in darkness when applying it to the plate holder because of the extreme sensitiveness of said red-sensitive film, but, when the backing is used, a weak ruby light may be employed in the dark room if care is exercised to prevent access of the same to the face of the pack either directly or by reflection.

To protect the film pack during transportation or when in storage, and also to facilitate the safe handling of the same in the dark room, I inclose the pack in a light-proof casing or envelop 11, preferably with the blue-sensitive plate toward the face of the latter, whereby, when the envelop is opened, the plate can be slipped from the same with the protected side 7 uppermost and placed in the plate holder without turning the face of the pack toward the light.

While, for convenience of handling and to preserve the proper relation of the various elements of the film pack, I prefer to bind the edges, or at least two of the edges, of the same in the manner described; this is not absolutely essential, for, if the front and rear plates are sufficiently rigid, enough pressure may be exerted upon them in the plate holder to retain them in proper relation to each other and in proper position in the holder. In order to avoid, in the claims, the use of alternate phrases, I have denominated as a "member" each of the plates or films to which the color sensitive coating or emulsion is applied, have distinguished the latter by the term "coating" and have applied the term "color screen" to the thin film or deposit of coloring matter.

I claim:—

1. As an element of a film pack for three color photography, a member having thereupon a dry, superficial and soluble monochrome film acting as a color screen.

2. As an element of a film pack for three color photography, a member having a sensitive coating upon its face and having directly upon said coating a dry, superficial and soluble monochrome film acting as a color screen.

3. As an element of a film pack for three color photography, a member having thereupon a dry, attenuated, superficial and soluble monochrome film acting as a color screen.

4. As an element of a film pack for three color photography, a member having a sensitive coating upon its face and having directly upon said coating a dry, attenuated, superficial and soluble monochrome film acting as a color screen.

5. A film pack for three-color photography, said film pack comprising three members, each having a coating of a color-sensitiveness different from either of the others, and a color screen interposed between each pair of said members, and consisting of a superficial and soluble deposit of coloring material applied to one of said members.

6. A film pack for three-color photography, said film pack comprising essentially, but three members with color-sensitive coating and interposed color screens, the whole being bound together at the edges to constitute a unitary body.

7. A film pack for three-color photography, said film pack comprising three members, the outer members having coatings sensitive respectively to blue and red and the intermediate member having a coating sensitive to green, the coating of the blue-sensitive member being of notably finer grain and greater transparency than those of the other members.

In testimony whereof, I have signed my name to this specification, in the presence of two subscribing witnesses.

FREDERIC E. IVES.

Witnesses:
LLEWELYN WATTS,
HERBERT O. PRENTICE.